(12) United States Patent
Berry et al.

(10) Patent No.: US 7,353,936 B2
(45) Date of Patent: Apr. 8, 2008

(54) WIPER APPARATUS FOR CLEARING SHAVINGS

(76) Inventors: James Berry, 3942 Glencoe Ave., Venice, CA (US) 90291; Gary Berry, 3635 Wasatch Ave., Los Angeles, CA (US) 90066; John B. Adrain, c/o Pearne & Gordon LLP, 1801 E. 9th St., Suite 1200, Cleveland, OH (US) 44114-3108

( * ) Notice: Subject to any disclaimer, the term of this patent is extended or adjusted under 35 U.S.C. 154(b) by 295 days.

(21) Appl. No.: 11/206,546

(22) Filed: Aug. 18, 2005

(65) Prior Publication Data

US 2006/0150351 A1 Jul. 13, 2006

Related U.S. Application Data

(60) Provisional application No. 60/602,760, filed on Aug. 19, 2004.

(51) Int. Cl.
*B65G 31/04* (2006.01)

(52) U.S. Cl. .................. 198/642; 198/518; 198/671

(58) Field of Classification Search ............... 198/493, 198/494, 518, 671, 638, 642
See application file for complete search history.

(56) References Cited

U.S. PATENT DOCUMENTS

| | | | | |
|---|---|---|---|---|
| 3,209,925 A * | 10/1965 | Coenen | ............. | 414/301 |
| 3,556,605 A * | 1/1971 | Berg, Sr. et al. | ............. | 198/642 |
| 3,642,153 A * | 2/1972 | Adler et al. | ............. | 414/306 |
| 3,650,369 A * | 3/1972 | Vergobbi | ............. | 406/31 |
| 3,899,066 A * | 8/1975 | Bedwell et al. | ............. | 198/518 |
| 4,043,445 A * | 8/1977 | Wirth et al. | ............. | 198/611 |
| 4,069,928 A * | 1/1978 | Teske et al. | ............. | 414/307 |
| 4,072,062 A * | 2/1978 | Morling et al. | ............. | 198/834 |
| 4,116,192 A * | 9/1978 | Scott | ............. | 124/51.1 |
| 4,197,092 A * | 4/1980 | Bretz | ............. | 48/86 R |
| 4,231,468 A * | 11/1980 | Tucker | ............. | 198/515 |
| 4,516,674 A * | 5/1985 | Firth | ............. | 198/617 |
| 4,725,005 A * | 2/1988 | Wiegelmann | ............. | 239/682 |
| 4,966,508 A * | 10/1990 | Otani et al. | ............. | 409/189 |
| 5,219,103 A * | 6/1993 | Carper | ............. | 222/240 |
| 5,257,691 A * | 11/1993 | Spies | ............. | 198/642 |
| 5,356,280 A * | 10/1994 | Ponzielli | ............. | 425/201 |
| 7,213,699 B2 * | 5/2007 | Adams | ............. | 198/608 |
| 7,252,473 B2 * | 8/2007 | Bailey | ............. | 414/339 |

\* cited by examiner

*Primary Examiner*—Joe Dillon, Jr.
(74) *Attorney, Agent, or Firm*—Pearne & Gordon LLP

(57) ABSTRACT

A wiper apparatus for sweeping or clearing debris from a surface, such as cuttings generated in a machining operation that have collected on a collecting surface, comprises rotatable wiper arms and dependent wiper blades. The wiper apparatus can be self-powered or it can be driven by a screw mechanism that engages the wiper arms, causing the wiper arms to rotate. The wipers are capable of relative movement in relation to the wiper arms, and the wipers may be rigid or flexible. Springs can be used to mount the wipers to the wiper arms. According to one embodiment, the wiper apparatus comprises a central portion including a hub to which the wiper arms are secured and a base adapted to be secured to the collecting surface. The hub is rotatably mounted to the base.

21 Claims, 3 Drawing Sheets

WIPER APPARATUS FOR CLEARING SHAVINGS

BACKGROUND OF THE INVENTION

The present invention relates generally to apparatus for sweeping or clearing debris from a surface and more particularly to apparatus having rotating wipers for removing from a collection surface shavings or cuttings generated by a machine tool operation.

Shavings or cuttings (hereinafter referred to collectively as cuttings) are generated during a machine tool operation. For example, metal or plastic cuttings are generated as a piece of stock metal or plastic is processed or machined by the machine tool. Because these cuttings tend to accumulate at the machine tool and can interfere with the machining process, some means of dealing with the cuttings is desired.

One method of handling the cuttings involves the use of a screw mechanism or conveyance. The cuttings are caused to be collected in a contained space in the nature of a trough in which the screw mechanism is located, and, as the screw turns, the cuttings are advanced along the axis of the screw to a disposal site.

Machine tool processes often use a fluid as a coolant and/or lubricant to aid in the machining (e.g., drilling, cutting or grinding) operation. As a piece of stock is machined, lubricant is sprayed onto the cutting surface to cool and reduce the friction between the cutting tool and the stock. This fluid typically is collected and reused in the machining process. Most often, the fluid is allowed to drip down into a collecting area near the cutting area. The fluid then drains from the collecting area to a holding area to await reuse.

The collecting area can be overlain by a cover such as, for example, a screen or a section of perforated sheet metal. The cover allows the fluid to pass through to the collecting area for the fluid but prevents debris, including cuttings generated during the machining operation, from entering the collecting area. The cuttings, possibly covered with the fluid from the machining process, can accumulate on the cover directly above the fluid collecting area. When cuttings accumulate above the fluid collecting area, the fluid can drip from the cuttings through the cover and into the collecting area.

For a variety of reasons it is desirable to remove the cuttings that collect on the cover. One method of doing so is to cause the cuttings to be collected and conveyed from the machining operation by a screw mechanism as indicated above.

SUMMARY OF THE INVENTION

According to one aspect of the invention, there is provided an apparatus for sweeping or wiping from a collecting surface cuttings generated by a machine tool process. The apparatus comprises a central portion that is adapted to be secured in place adjacent the collecting surface. The central portion includes a hub that is mounted for rotational movement about an axis of rotation. One or more wiper arms having opposed ends are provided. One opposed end of each of the wiper arms is attached to the hub, and each of the wiper arms extends from the hub so as to be adapted to be located over the collecting surface. A respective wiper blade is secured to at least one of the one or more wiper arms and is adapted to engage the collecting surface. Consequently, as the hub rotates and carries with it the wiper arms and wiper blades, the wiper blades, because they engage the collecting surface, will sweep from the collecting surface the cuttings that have collected at the collecting surface. According to a particular aspect, the central portion of the apparatus includes a base that is adapted to be secured to the collecting surface, and the hub is rotatably mounted to the base.

According to a further aspect, a plurality of wiper arms are spaced substantially equidistantly around the hub and each of the wiper arms extends substantially radially from the hub. At least one of wiper blades is capable of movement in relation to the wiper arm. According to a particular aspect, at least one of the wiper blades that is capable of movement in relation to the wiper arm includes a mounting surface and the at least one wiper blade including a mounting surface is secured to the respective wiper arm by one or more springs attached to the mounting surface and the respective wiping arm.

According to another aspect, a driving device is located in the central portion of the apparatus and is connected to the hub whereby the hub is rotated about its axis of rotation.

According to yet another aspect, the wiper arms are of a sufficient number and length and are appropriately spaced such that they are adapted to be continuously engaged by a screw mechanism that is located adjacent the collecting surface. As a result, the wiper arms can be rotated about the axis of rotation of the hub by the advancement of the screw mechanism.

DETAILED DESCRIPTION OF EMBODIMENTS OF THE INVENTION

Figure 1:
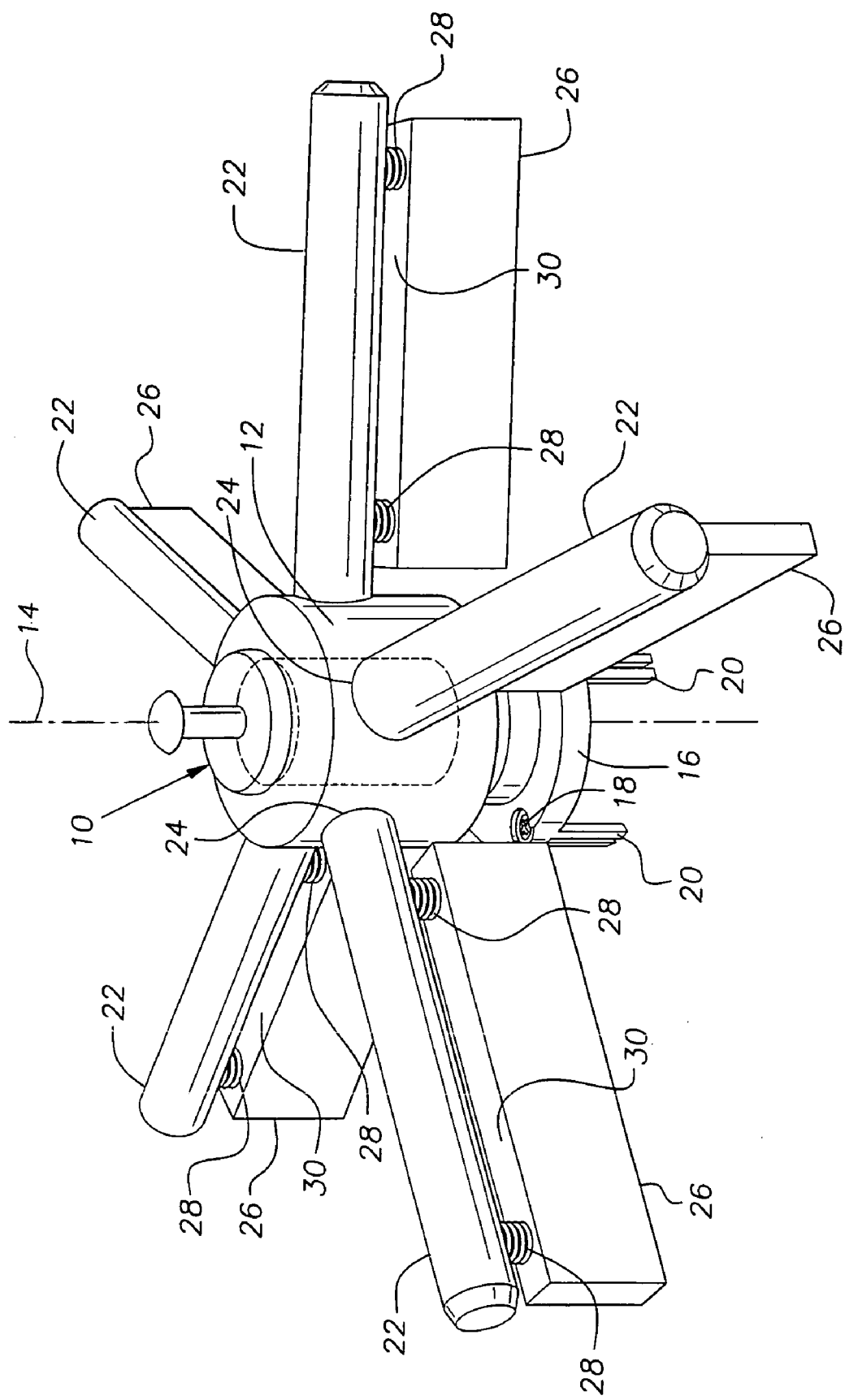
FIG. 1 is a perspective view of an embodiment of the wiper apparatus of the invention.

FIG. 1 of the drawings illustrates one embodiment of the wiper apparatus of the invention that can be used generally to sweep or clear debris from a surface such as a surface associated with a machining tool. In the case of a machining tool, the apparatus can be used to sweep away cuttings that have collected on a surface below the machining operation. The wiper apparatus includes a central portion, indicated generally at 10, that is adapted to be secured in place adjacent a surface such as a collecting surface for cuttings generated by a machining operation as described in more detail below. The central portion of the wiper apparatus includes a hub 12 that is mounted for rotational movement about an axis of rotation 14. The central portion of the wiper apparatus shown in FIG. 1 also includes a base 16 that is adapted to be secured adjacent the collecting surface as described in greater detail below, and the hub 12 is rotatably mounted to the base 16. Fasteners such as screws 18 within expandable fastening elements 20, for example, can be used to secure the wiper apparatus in place.

The wiper apparatus also includes one or more wiper arms. In the embodiment of the invention illustrated in FIG. 1, five wiper arms 22 are provided. The wiper arms have opposed ends and one opposed end 24 of each of the wiper blades is attached to the hub 12. The wiper arms 22 extend from the hub 12 so as to be adapted to be located over the collecting surface for the cuttings generated by the machining operation as is described in greater detail below. In the embodiment of FIG. 1, the plurality of wiper arms are spaced substantially equidistantly around the hub 12 and the wiper arms extend radially from the hub.

The wiper apparatus further comprises a respective wiper blade or scraper 26 secured to at least one of the one or more wiper arms 22 that are provided on the hub 12. In the embodiment of FIG. 1, a respective wiper blade 26 is secured to each of the wiper arms 22. As is described in greater detail below, the wiper blades 26 are adapted to engage the collecting surface and sweep the cuttings from the collecting surface.

Although the wiper blades 26 can be made of a rigid material and fixedly secured to the wiper arms, it is also possible to have at least one of the wipers blades secured to a respective wiper arm 22 in a manner to allow for movement of the wiper blade 26 in relation to the wiper arm. In this connection, a wiper blade 26 can be fixedly attached to a wiper arm along the entire length of the wiper blade and the wiper blade can be made of a flexible material such as a type of rubber or plastic, for example, or the wiper blade can be made of a brush-like material, whereby the wiper blade will be able to move in relation to the wiper arm 22. In the embodiment of the invention shown in FIG. 1, the relative movement between the wiper blade 26 and the wiper arm 22 is provided for by the manner in which the wiper blade is secured to the wiper arm. Specifically, springs 28 are employed to secure the wiper blade 26 to the wiper arm 22. The wiper arms 22 include mounting surfaces 30 and at least one wiper blade 26 is secured to a respective wiper arm 22 by one or more of the springs 28 attached to the mounting surface 30 of at least one wiper blade 26 and the respective wiping arm to which the wiper blade is secured. In the embodiment of FIG. 1, a pair of springs 28 is used to secure each of the wiper blades 26 to a respective wiper arm 22. Even though the use of the mounting springs provide flexibility so that the wiper blades can be made of a rigid material, such as a metal or a rigid plastic or rubber for example, additional flexibility can be provided by making the wiper blades of a flexible rubber or plastic.

For the purpose of powering or driving the hub 12 and associated wiper arms 22 and dependent wiper blades 26, a driving device such as an electric motor, for example, indicated generally at 32 can be located within the central portion 10 of the wiper apparatus. The manner of securing the drive shaft, or the like, of the electric motor to the hub 12, using an appropriate gearing arrangement as necessary, so as to rotate the hub, is familiar to those having ordinary skill in the art and is not described here. In this connection, a clutch can be provided in the drive train between the motor 32 and the hub 12 in order to protect the components of the wiper apparatus from damage in the event a wiper arm and/or wiper blade becomes jammed and is unable to rotate.

Figure 2:
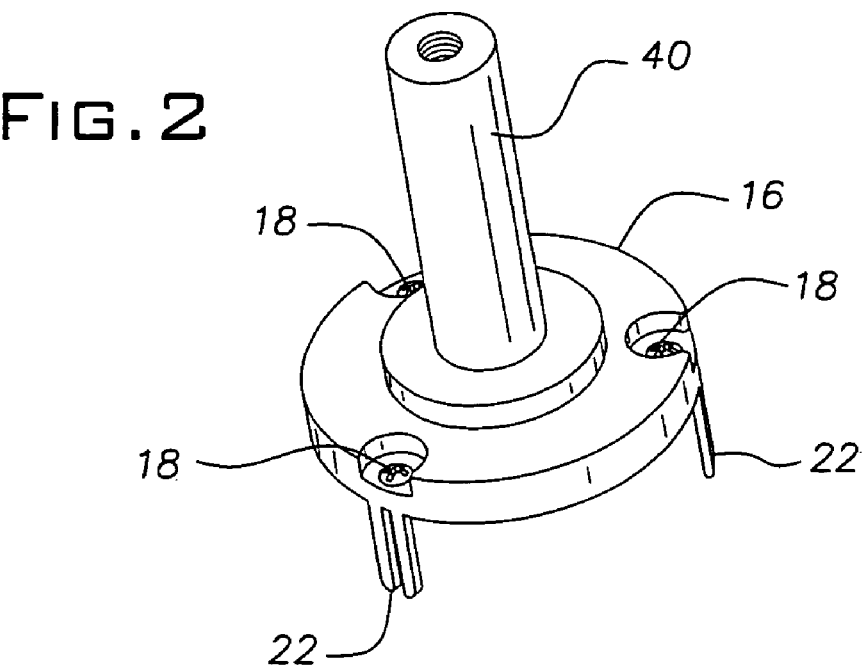
FIG. 2 is a perspective view of a first embodiment of a base for the wiper apparatus of the invention.
Figure 3:
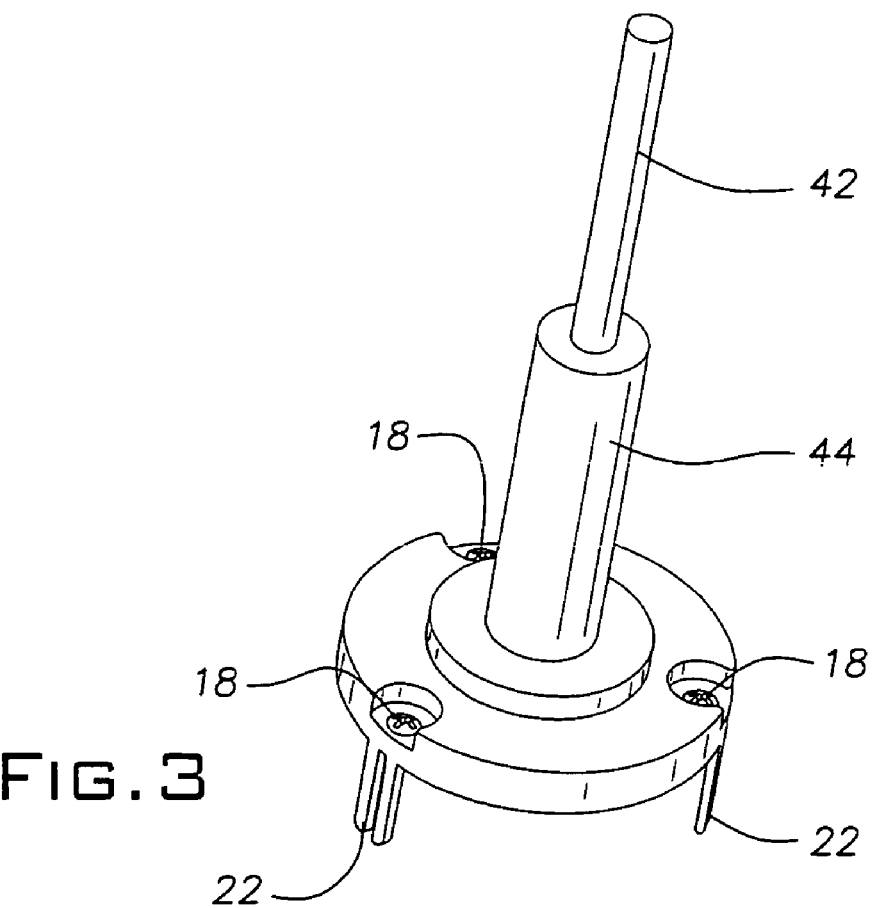
FIG. 3 is a perspective view of a second embodiment of a base for the wiper apparatus of the invention.

Referring now to FIGS. 2 and 3, there are illustrated two embodiments of bases on which the hub 12 can be rotatably mounted. In FIG. 2, the base 16 includes a neck portion 40. The hub 12 can be rotatably mounted, using suitable bearing structures, about the exterior or within the interior of the neck portion 40. Alternatively, as shown in FIG. 3, a rod 42 can be secured to a modified neck portion 44 of the base 46 and the hub 12 can be rotatably mounted to the rod using a suitable bearing arrangement.

Figure 4:
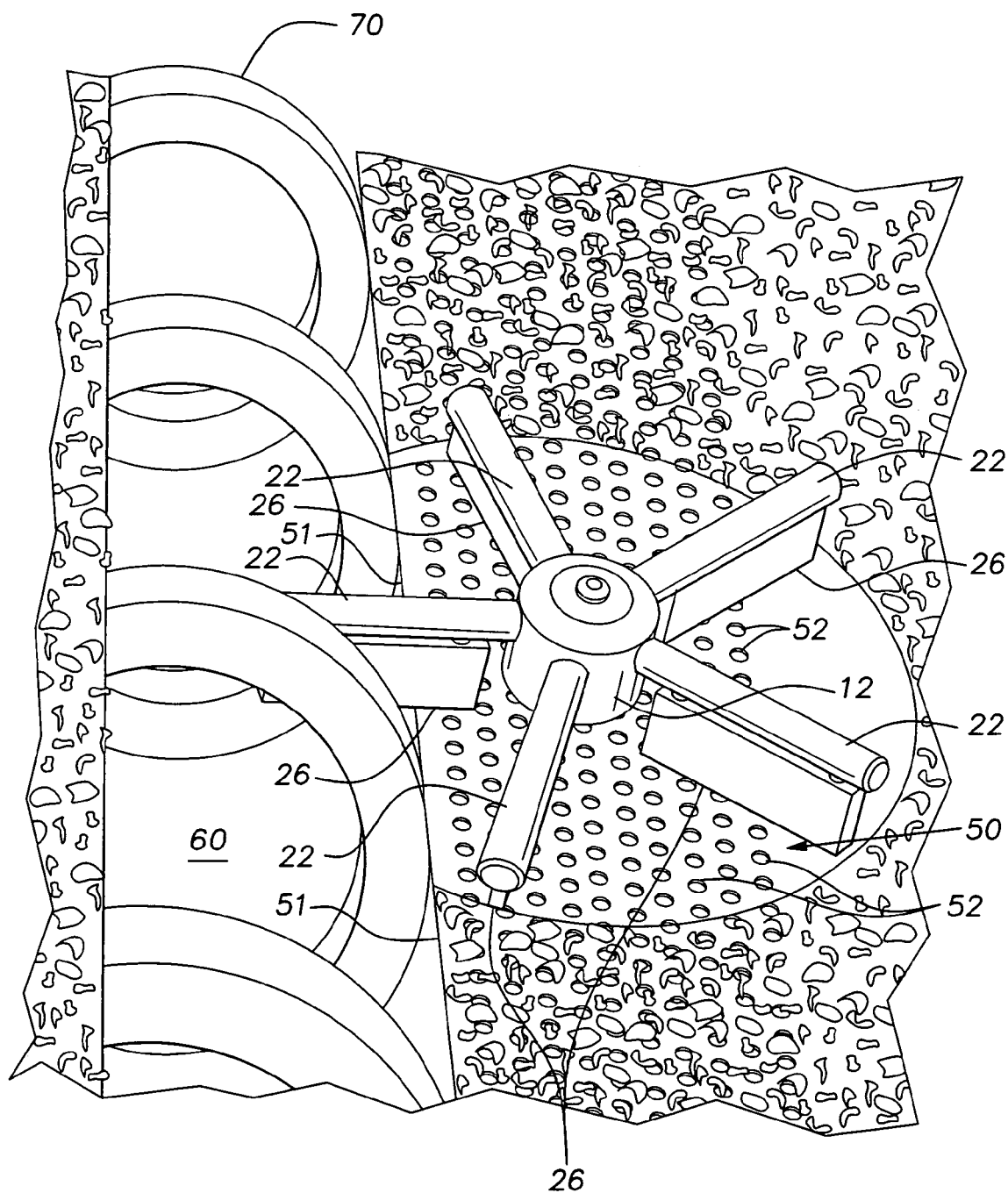
FIG. 4 is a perspective view of an embodiment of the wiper apparatus of the invention installed on a machine tool.

FIG. 4 of the drawings shows an embodiment of the wiper apparatus of the invention in place on a surface 50 on which cuttings from a machine tool operation can collect. The surface 50 comprises a sheet of metal having a plurality of holes 52. The cuttings that fall from the machine tool as the machining process proceeds will collect on the collecting surface 50. Coolants and/or lubricants also will fall onto the surface 50 but will pass through the holes 52 together with any coolants and/or lubricants that may drip from the cuttings.

The wiper apparatus is secured to the collecting surface 50 by means of the screws 18 and expandable fastening elements 20 that are inserted in selected ones of holes 52 that are in alignment with the expandable elements. As will be understood by those skilled in the art, the elements 20 expand when the screws 18 are driven within the elements and the wiper apparatus is thereby secured to the collecting surface 50. With the wiper apparatus secured to the collecting surface, the wiper arms 22 are located over the collecting surface and the wiper blades 26 engage the collecting surface 50.

Located along the collecting surface 50 is a trough 60 within which a screw mechanism 70 axially extends. The screw mechanism, as it turns or rotates, serves to convey materials within the trough 60 along the trough to one end of the trough to a disposal site not shown. In addition, in the embodiment of the invention shown in FIG. 4, the wiper mechanism need not be provided with a motor to drive the hub 12. Rather, the screw mechanism 70 serves to drive the wiper arms 22 and wiper blades 26 of the wiper apparatus. Specifically, as can be seen in FIG. 4, the wiper arms 22 are of a length such that they extend out over the edge 51 of the collecting surface into the path of the screw mechanism 70. Consequently, the turns of the screw mechanism 70 will sequentially engage the wiper arms 22 and the wiper arms will be rotated thereby. As the wiper arms rotate, the wipers will sweep from the collecting surface 50 the cuttings that have collected on the collecting surface. It will be understood by those having ordinary skill in the art that the wiper arms 22 will be of a sufficient number and length and be appropriately spaced to take into account the pitch of the screw mechanism 70 such that the wiper arms will be continuously engaged by the screw mechanism. It will also be understood from the foregoing description that should a wiper blade 26 encounter an obstacle that is held firmly in place or too large to move, the wiper blade may pass over the obstacle through the flexing of the springs 28. In addition, as described above, the wiper blades 26 can be made of a flexible material and further flexibility thereby imparted to the wiper blades.

The invention has been described with reference to specific embodiments. However, it will be understood by those skilled in the art that various alternatives may be used and equivalents may be substituted for components described herein without departing from the scope of the invention. For example, with reference to FIG. 4, a plurality or gang of wiper apparatuses can be arranged over the collecting surface 50 along the edge 51 of the collecting surface so that a larger portion of the collecting surface can be cleared of cuttings. Modifications may be necessary to adapt the invention to a particular situation or to particular needs without departing from the scope of the invention. It is intended that the invention not be limited to the particular embodiments described herein, but that the claims be given their broadest interpretation to cover all embodiments, literal or equivalent, covered thereby.

What is claimed is:

1. An apparatus which sweeps from a collecting surface cuttings generated by a machine tool process, the apparatus comprising:

a central portion adjacent the collecting surface and adapted to be secured in place, the central portion including a hub mounted for rotational movement about an axis of rotation;

one or more wiper arms having opposed ends, one opposed end of each of the one or more wiper arms being attached to the hub and each of the one or more wiper arms extending away from the hub and located over the collecting surface; and a respective wiper blade secured to at least one of the one or more wiper arms and which engages the collecting surface sweeping cuttings away from the machine tool process.

2. The apparatus of claim 1 wherein the central portion of the apparatus includes a base adapted to be secured to the collecting surface and the hub is rotatably mounted to the base.

3. The apparatus of claim 1 wherein a plurality of wiper arms are spaced substantially equidistantly around the hub and wherein each of the wiper arms extends from its one opposed end attached to the hub substantially radially from the hub.

4. The apparatus of claim 1 wherein at least one wiper blade is capable of movement in relation to the wiper arm.

5. The apparatus of claim 4 wherein at least one of the wiper blades that is capable of movement of in relation to the wiper arm includes a mounting surface and the at least one wiper blade including a mounting surface is secured to the respective wiper arm by one or more springs attached to the mounting surface and the respective wiping arm.

6. The apparatus of claim 1 wherein a driving device is located in the central portion of the apparatus and is connected to the hub whereby the hub is rotated about its axis of rotation.

7. The apparatus of claim 1 wherein the wiper arms are of a sufficient number and length and are appropriately spaced such that they are adapted to be continuously engaged by a screw mechanism that is adjacent the collecting surface whereby the wiper arms can be rotated about the axis of rotation of the hub by the advancement of the screw mechanism.

8. The apparatus of claim 2 wherein a plurality of wiper arms are spaced substantially equidistantly around the hub and wherein each of the wiper arms extends from its one opposed end attached to the hub substantially radially from the hub.

9. The apparatus of claim 2 wherein at least one wiper blade is capable of movement in relation to the wiper arm.

10. The apparatus of claim 9 wherein at least one of the wiper blades that is capable of movement in relation to the wiper arm includes a mounting surface and the at least one blade wiper including a mounting surface is secured to the respective wiper arm by one or more springs attached to the mounting surface and the respective wiping arm.

11. The apparatus of claim 2 wherein a driving device is located in the central portion of the apparatus and is connected to the hub whereby the hub is rotated about its axis of rotation.

12. The apparatus of claim 2 wherein the wiper arms are of a sufficient number and length and are appropriately spaced such that they are adapted to be continuously engaged by a screw mechanism that is adjacent the collecting surface whereby the wiper arms can be rotated about the axis of rotation of the hub by the advancement of the screw mechanism.

13. The apparatus of claim 8 wherein at least one wiper blade is capable of movement in relation to the wiper arm.

14. The apparatus of claim 13 wherein at least one of the wiper blades that is capable of movement in relation to the wiper arm includes a mounting surface and the at least one wiper blade including a mounting surface is secured to the respective wiper arm by one or more springs attached to the mounting surface and the respective wiping arm.

15. The apparatus of claim 8 wherein a driving device is located in the central portion of the apparatus and is connected to the hub whereby the hub is rotated about its axis of rotation.

16. The apparatus of claim 8 wherein the wiper arms are of a sufficient number and length and are appropriately spaced such that they are adapted to be continuously engaged by a screw mechanism that is adjacent the collecting surface whereby the wiper arms can be rotated about the axis of rotation of the hub by the advancement of the screw mechanism.

17. The apparatus of claim 13 wherein a driving device is located in the central portion of the apparatus and is connected to the hub whereby the hub is rotated about its axis of rotation.

18. The apparatus of claim 13 wherein the wiper arms are of a sufficient number and length and are appropriately spaced such that they are adapted to be continuously engaged by a screw mechanism that is adjacent the collecting surface whereby the wiper arms can be rotated about the axis of rotation of the hub by the advancement of the screw mechanism.

19. The apparatus of claim 14 wherein a driving device is located in the central portion of the apparatus and is connected to the hub whereby the hub is rotated about its axis of rotation.

20. The apparatus of claim 14 wherein the wiper arms are of a sufficient number and length and are appropriately spaced such that they are adapted to be continuously engaged by a screw mechanism that is adjacent the collecting surface whereby the wiper arms can be rotated about the axis of rotation of the hub by the advancement of the screw mechanism.

21. The apparatus of claim 19 wherein the wiper arms are of a sufficient number and length and are appropriately spaced such that they are adapted to be continuously engaged by a screw mechanism that is adjacent the collecting surface whereby the wiper arms can be rotated about the axis of rotation of the hub by the advancement of the screw mechanism.

* * * * *